United States Patent
Murakami et al.

(10) Patent No.: US 8,447,101 B2
(45) Date of Patent: May 21, 2013

(54) IMAGE PROCESSING APPARATUS, IMAGE FORMING APPARATUS, IMAGE PROCESSING METHOD, AND STORAGE MEDIUM

(75) Inventors: Yoshinori Murakami, Osaka (JP); Makio Gotoh, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 38 days.

(21) Appl. No.: 13/304,471

(22) Filed: Nov. 25, 2011

(65) Prior Publication Data

US 2012/0134580 A1 May 31, 2012

(30) Foreign Application Priority Data

Nov. 29, 2010 (JP) ................................. 2010-265199

(51) Int. Cl.
*G06K 9/2003* (2006.01)

(52) U.S. Cl.
USPC ............ 382/163; 382/162; 382/164; 382/165

(58) Field of Classification Search
USPC ................. 382/162, 163, 164, 165, 173, 252, 382/254; 358/462, 2.1, 3.06, 3.21
See application file for complete search history.

(56) References Cited

U.S. PATENT DOCUMENTS 7,791,764 B2 * 9/2010 Kubota .......................... 358/2.1

FOREIGN PATENT DOCUMENTS

| JP | 2001-16401 A | 1/2001 |
| JP | 2002-10079 A | 1/2002 |
| JP | 2006-115220 A | 4/2006 |

* cited by examiner

*Primary Examiner* — Anh Do

(74) *Attorney, Agent, or Firm* — Birch, Stewart, Kolasch & Birch, LLP

(57) ABSTRACT

Unevenness in density (line noise) resulting from color misregistration among RGB components in a halftone region or a line screen region is suppressed. With respect to a document that is discriminated as a printed photo document or a text/printed photo document that includes black halftones by a document type discrimination section, or to a region segmented into a black halftone region by a segmentation section, a non-uniform image suppressing operation mode is executed. In the non-uniform image suppressing operation mode, a black generation and under color removal section does not carry out a black generation and under color removal process on a pixel in which a minimum value of the image data of the plurality of color components is at least equal to or less than a predetermined threshold.

14 Claims, 13 Drawing Sheets

F I G. 1
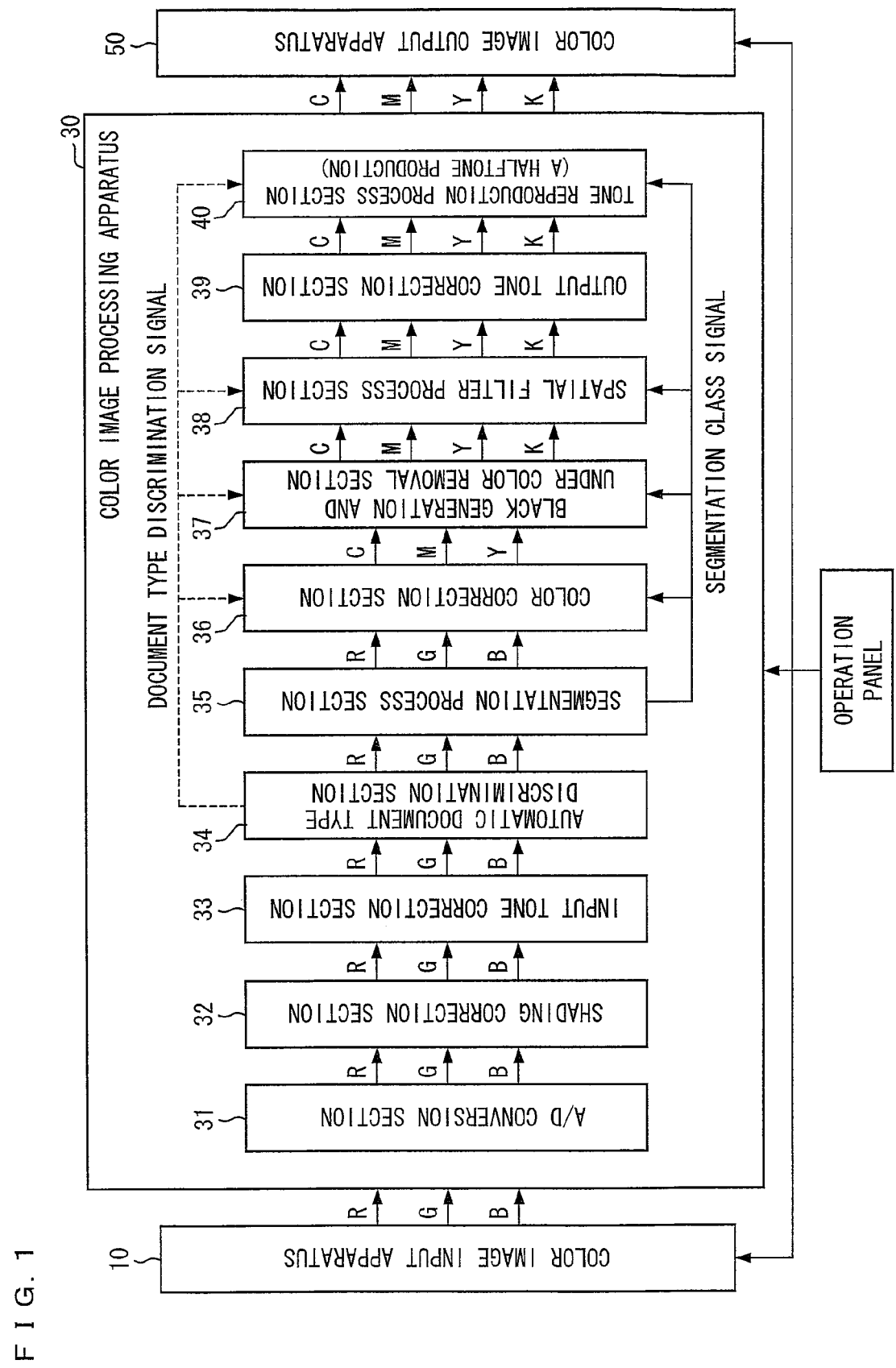

FIG. 2

|   | * | 7/16 |
|---|---|------|
| 3/16 | 5/16 | 1/16 |

|   |   | * | 15/64 | 6/64 |
|---|---|---|-------|------|
| 4/64 | 2/64 | 10/64 | 8/64 | 4/64 |
| 1/64 | 4/64 | 6/64 | 4/64 | 0/64 |

(b)

|   |   | * | 2/64 | 6/64 |
|---|---|---|------|------|
| 4/64 | 10/64 | 8/64 | 15/64 | 4/64 |
| 1/64 | 4/64 | 6/64 | 4/64 | 0/64 |

(c)

|   |   | * | 10/64 | 6/64 |
|---|---|---|-------|------|
| 4/64 | 8/64 | 15/64 | 2/64 | 4/64 |
| 1/64 | 4/64 | 6/64 | 4/64 | 0/64 |

(d)

|   |   | * | 8/64 | 6/64 |
|---|---|---|------|------|
| 4/64 | 15/64 | 2/64 | 10/64 | 4/64 |
| 1/64 | 4/64 | 6/64 | 4/64 | 0/64 |

F I G. 4
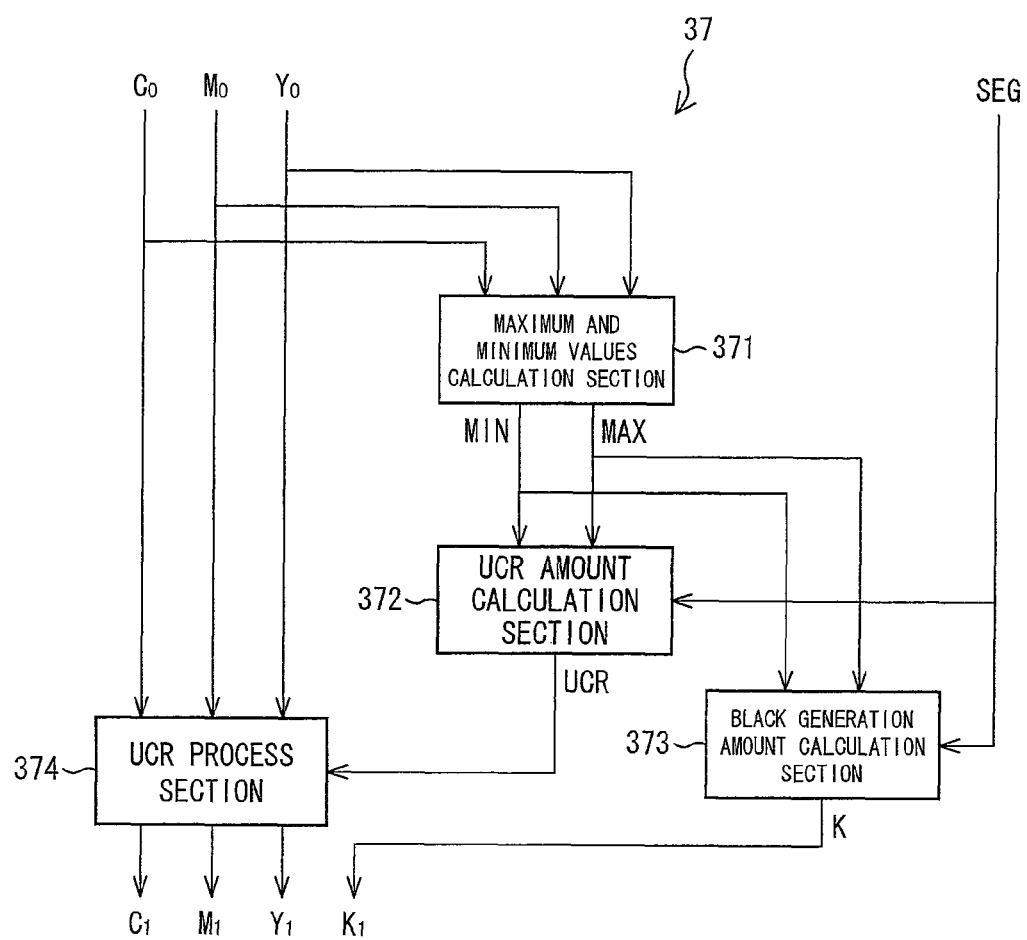

F I G. 7
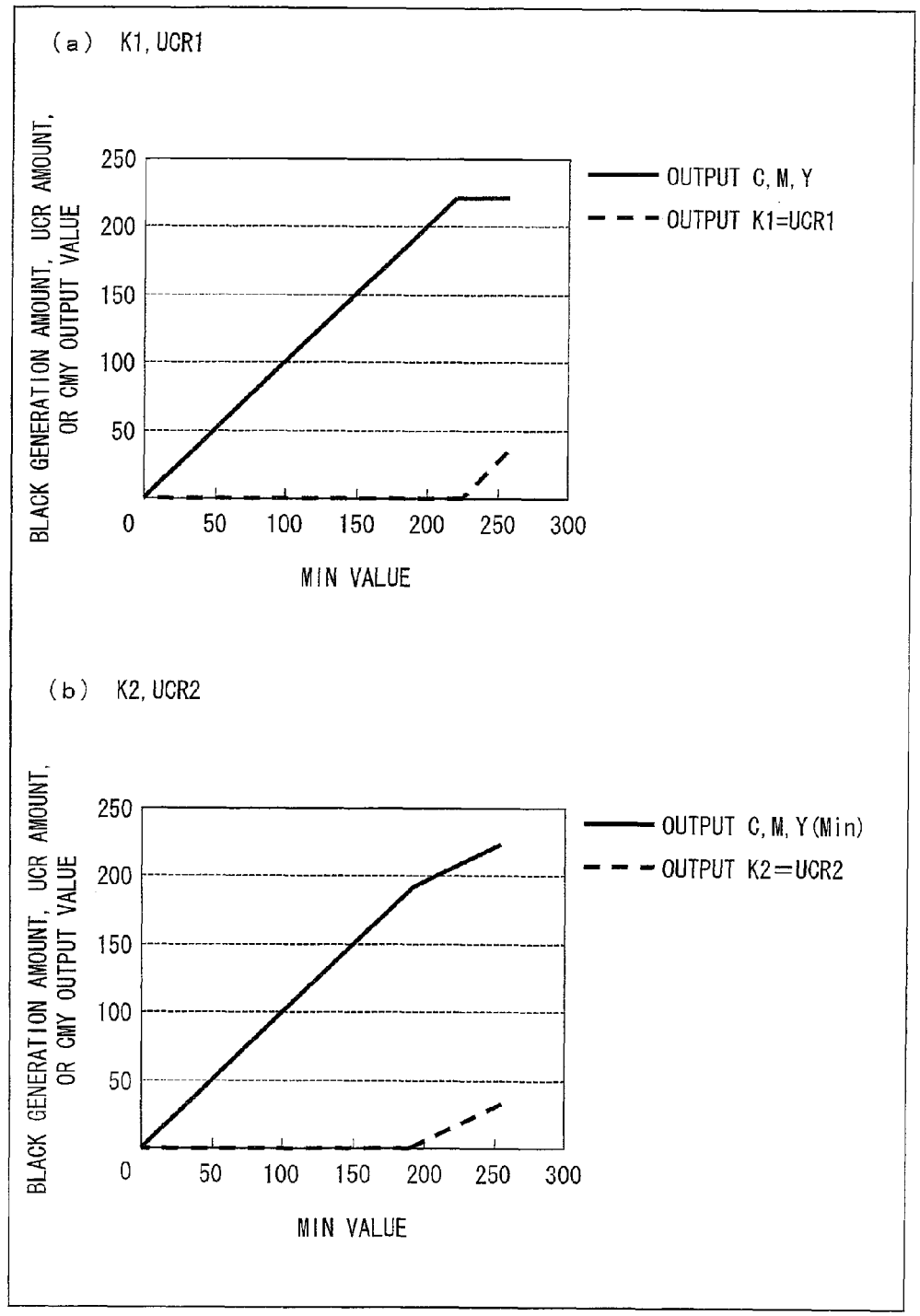

F I G. 1 2
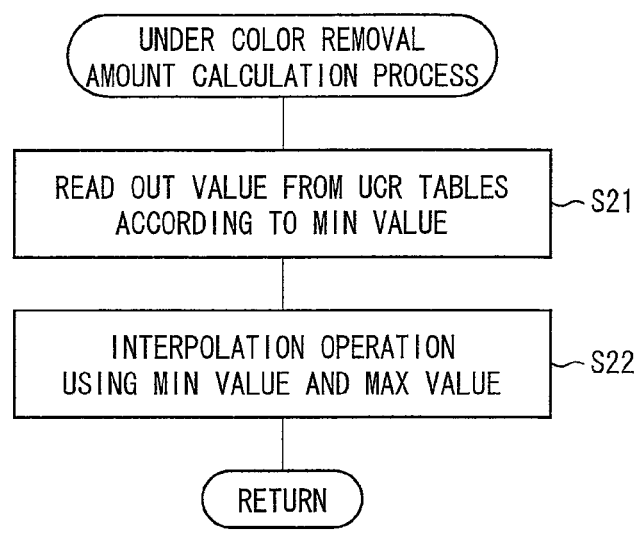

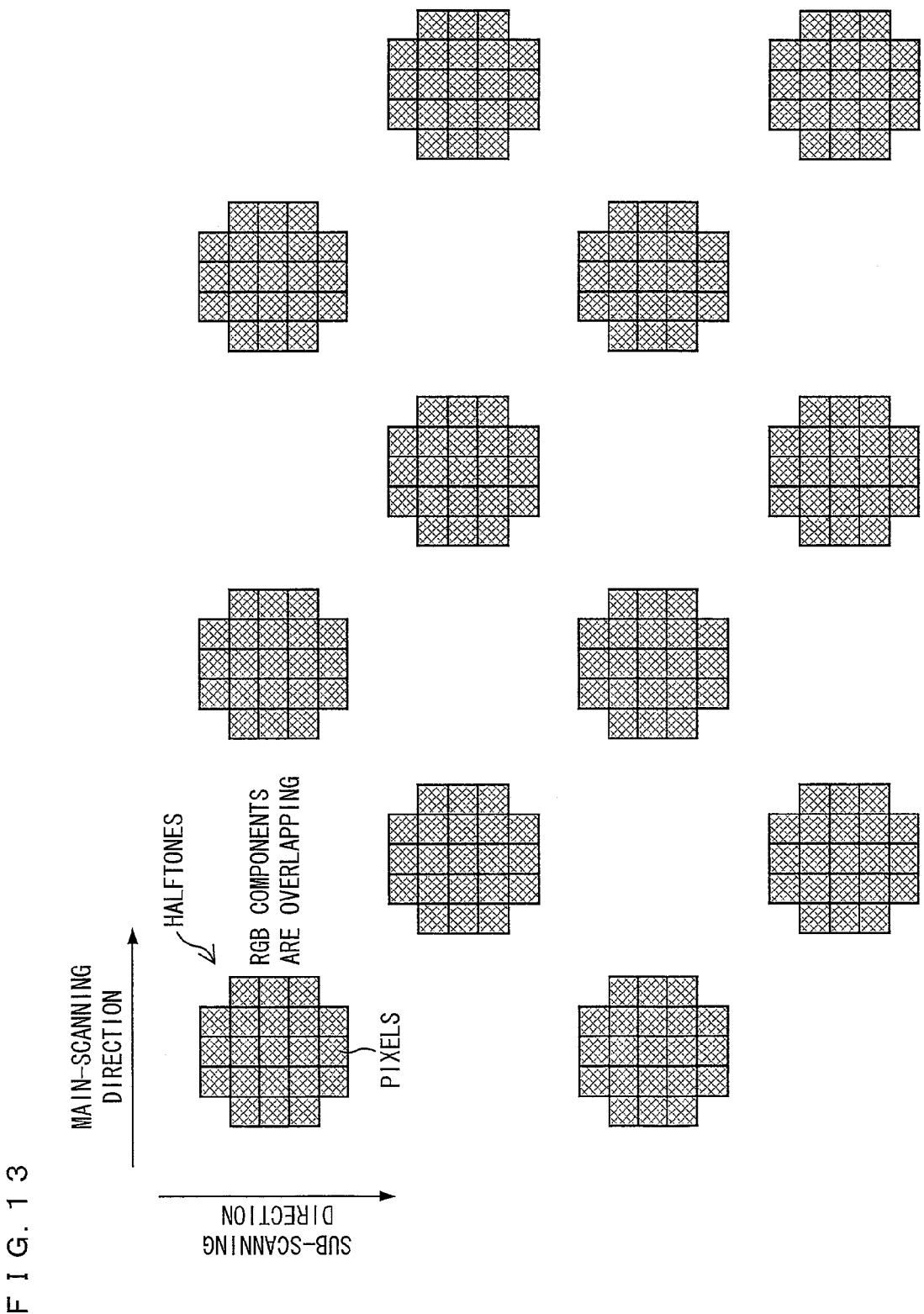

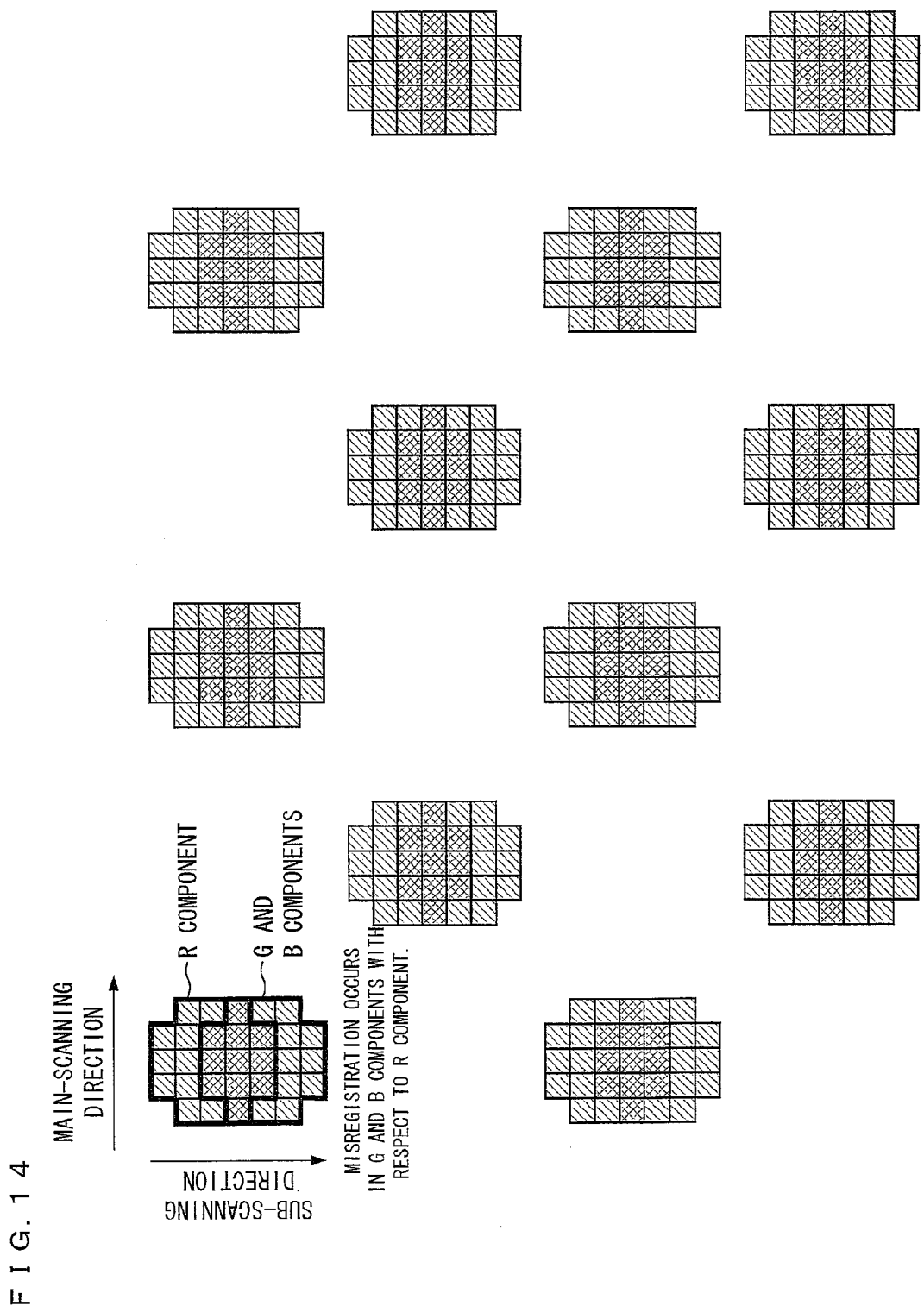

IMAGE PROCESSING APPARATUS, IMAGE FORMING APPARATUS, IMAGE PROCESSING METHOD, AND STORAGE MEDIUM

This Nonprovisional application claims priority under 35 U.S.C. §119(a) on Patent Application No. 2010-265199 filed in Japan on Nov. 29, 2010, the entire contents of which are hereby incorporated by reference.

TECHNICAL FIELD

This invention relates to, for a color image, an image processing apparatus, an image forming apparatus, and an image processing method.

BACKGROUND ART

Conventionally, a number of methods have been proposed to detect and correct color misregistration of an image input apparatus that reads an object by means of a three-line sensor having three lines, such as R, G and B. Among them, Patent Literature 1 discloses a method for correcting even color misregistration caused by an optical axis misalignment of an optical system resulting from mechanical vibration or the like.

In the method of Patent Literature 1, reference patterns are provided in a read region of an object and edges of straight lines included in the reference patterns are read by a predetermined one sensor of three sensors that a three-line sensor has. And the read values are averaged to obtain an average value a which is regarded as a read value when the machine does not vibrate, and then, from the differences between the average value a and the each read value of the edges of the straight lines, a misregistration amount of the each read location on the edges of the straight lines is calculated out. Based on these misregistration amounts, misregistration amount of the each read locations in the read lines between the edges is determined, and, based on these misregistration amounts, the read output values of the sensors are corrected.

CITATION LIST

Patent Literature 1

Japanese Patent Application Publication, Tokukai, No. 2001-16401 A (Publication Date: Jan. 19, 2001)

SUMMARY OF INVENTION

Technical Problem

If misregistration occurs in RGB components, overlapping area of CMY components after a color correction is reduced, so that a black generation amount is reduced as compared with a case in which no misregistration occurs, which results in producing unevenness in density (line noise). The line noise is conspicuous not in a color region but in a black or gray region (a halftone region or a line screen region), which will specifically be described below.

If an image input apparatus vibrates, color misregistration may partially occur among R, G and B components in a sub-scanning direction. In a black halftone or line screens region, RGB signals constituting halftones or line screens overlap when the vibration of the image input apparatus is substantially negligible, whereas color misregistration would occur among R, G and B components in a sub-scanning direction when the image input apparatus vibrates. In the area where the RGB signals overlap, a black generation amount and an under color removal amount become increased (black is generated based on the overlapping area of C, M and Y after a color correction process), so that due to the large amount of black outputted after a tone reproduction process an achromatic color can be expressed. However, if misregistration occurs, the overlapping area is reduced and the black generation amount and the under color removal amount become decreased, so that due to the small amount of black outputted after a tone reproduction process a color shade generated by the difference in sizes of CMY areas would be perceived.

An example is illustrated with reference to FIGS. 13 to 15. In FIGS. 13 to 15, each square represents a pixel and the portions with hatched lines represent read pixels of a printed halftone portion, wherein a scanner reads in a sub-scanning direction. For easy illustration of the example, it is assumed that no color misregistration occurs between G and B components. If color misregistration does not occur at all, a black halftone region is read with RGB components overlapped as shown in FIG. 13. Otherwise the overlapping area of the RGB components in the black halftone region is reduced as shown in FIG. 14, and consequently the black generation amount and the under color removal amount are decreased as compared with those in the region shown in FIG. 13. If color misregistration in RGB components occurs due to mechanical vibration during reading, the region as shown in FIG. 14 would be conspicuous as a strip-shaped line noise extending in a main-scanning direction.

On the other hand, in a color region (FIG. 15) where there is little overlapping among RGB components, mechanical vibration, if any, hardly affects and a line noise is not significantly conspicuous.

The line noises occurred in the region include periodical and non-periodical line noises, and their frequency is greater than that of halftones or line screens. Also, the widths of the observed line noises are not uniform. When the method described in Patent Literature 1 is applied to such line noises, it is difficult to estimate each amount of misregistration in a document because of the un-uniform widths of the observed line noises.

Assuming that a misregistration amount is constant, when a scanner reads a document in a non-contact manner as with the case of Patent Literature 1, the scanner can simultaneously read the document and reference patterns, whereas, when the method is applied to a flat-bed type scanner, it is required to provide a read region of reference patterns in addition to a read region of a document. The reading of the reference patterns does not have to always be carried out, and, when the reading of the reference patterns is necessitated to carry out, it is necessary to change setting of the read regions so that the read regions include the reference patterns. This is troublesome. Alternatively, the reading of the reference patterns may be carried out separately from the reading of the document. In this case, however, the reading must be carried out twice and a misregistration amount when the document is read cannot always correspond to that when the reference patterns are read. The method as described in Patent literature 1 thus has a problem in accuracy in estimation of the misregistration amount.

The present invention has been accomplished in view of the problem mentioned above, and an object of the present invention is to provide an image processing apparatus which can suppress unevenness in density (line noise) occurred due to color misregistration among RGB components in a halftone or line screen region.

Solution to Problem

In order to attain the object, an image processing apparatus according to the present invention is an image processing apparatus for carrying out an image processing on image data composed of a plurality of color components, the image processing apparatus including: a document type discrimination section for discriminating a type of a document which is read to obtain the image data; an image processing section for carrying out enhancement and error diffusion processes on the image data; a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by the under color removal process, and the image processing apparatus being arranged in a manner such that if the document type discrimination section discriminates the document as a printed photo document or a text/printed photo document that includes black halftones, then the image processing section carrying out the enhancement and the error diffusion processes on the image data, and the black generation amount calculation section and the under color removal process section executing a non-uniform image suppressing operation mode in which no black generation and under color removal process is carried out on a pixel in which a minimum value of the image data composed of the plurality of color components is at least equal to or less than a predetermined threshold.

According to the configuration, because the enhancement and the error diffusion processes are carried out on a printed photo document or a text/printed photo document that includes black halftones, a blur of the output image can be suppressed and, for example, small texts, etc. on a map can clearly be indicated. During the enhancement and the error diffusion processes, if unevenness in density (line noise) occurs due to color misregistration in RGB components of the read image, the unevenness in density as well would possibly be enhanced, however, such unevenness in density is suppressed by executing the non-uniform image suppressing operation mode in which no black generation and under color removal process is carried out.

Another image processing apparatus according to the present invention is an image processing apparatus for carrying out an image processing on image data composed of a plurality of color components, the image processing apparatus including: a segmentation process section for segmenting the image data into a plurality of regions including at least a black halftone region; an image processing section for carrying out enhancement and error diffusion processes on the image data; a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by under color removal process, and the image processing apparatus being arranged in a manner such that with respect to a region segmented into the black halftone region by the segmentation process section, the image processing section carrying out the enhancement and error diffusion processes on the image data, and the black generation amount calculation section and the under color removal process section executing a non-uniform image suppressing operation mode in which no black generation and under color removal process is carried out on pixel whose color density is at least equal to or less than a predetermined color density.

According to the configuration, because the enhancement and the error diffusion processes are carried out with respect to a region segmented into a black halftone region, a blur of the output image can be suppressed and, for example, small texts, etc. on a map can clearly be indicated. During the enhancement and the error diffusion processes, if unevenness in density (line noise) occurs due to color misregistration in RGB components of the read image, the unevenness in density as well would possibly be enhanced, however, such unevenness in density is suppressed by executing the non-uniform image suppressing operation mode in which no black generation and under color removal process is carried out.

Yet another image processing apparatus according to the present invention is an image processing apparatus for carrying out an image processing on image data composed of a plurality of color components, including a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by the under color removal process, the black generation amount calculation section and the under color removal process section having a non-uniform image suppressing operation mode (i) in which no black generation and under color removal process is carried out on a pixel in which a minimum value of the image data composed of the plurality of color components is at least equal to or less than a predetermined threshold, and (ii) which can be manually selected or unselected.

According to the configuration, if unevenness in density (line noise) occurs due to color misregistration in RGB components of a read image, the unevenness in density (line noise) can be suppressed by selecting the non-uniform image suppressing operation mode in which no under color removal process is carried out.

Advantageous Effects of Invention

The present invention has an effect to suppress unevenness in density (line noise) in a read image by executing a non-uniform image suppressing operation mode in enhancement and error diffusion processes, wherein the unevenness in color density is caused due to color misregistration in RGB components of the read image.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram illustrating a configuration of an image forming apparatus according to one embodiment of the present invention.

FIG. 2 illustrates an example of diffusion coefficients for an error diffusion process suitable for a reproduction of a high frequency component.

FIG. 3 illustrates an example of diffusion coefficients for an error diffusion process suitable for a tone reproduction of a photograph.

FIG. 4 is a block diagram illustrating a configuration of a black generation and under color removal section.

FIG. 7 is a graph illustrating a black generation amount, an under color removal (UCR) amount and a CMY output value when a non-uniform image suppressing operation mode according to the present invention is executed, wherein small amounts of black generation and of an UCR are generated.

FIG. 12 is a flow chart illustrating steps of an under color removal amount calculation process.

FIG. 13 illustrates black halftones when no color misregistration occurs in an overlapping area of CMY.

FIG. 14 illustrates black halftones when color misregistration occurs in an overlapping area of CMY.

DESCRIPTION OF EMBODIMENTS

[Configuration of an Image Forming Apparatus]

Figure 5:
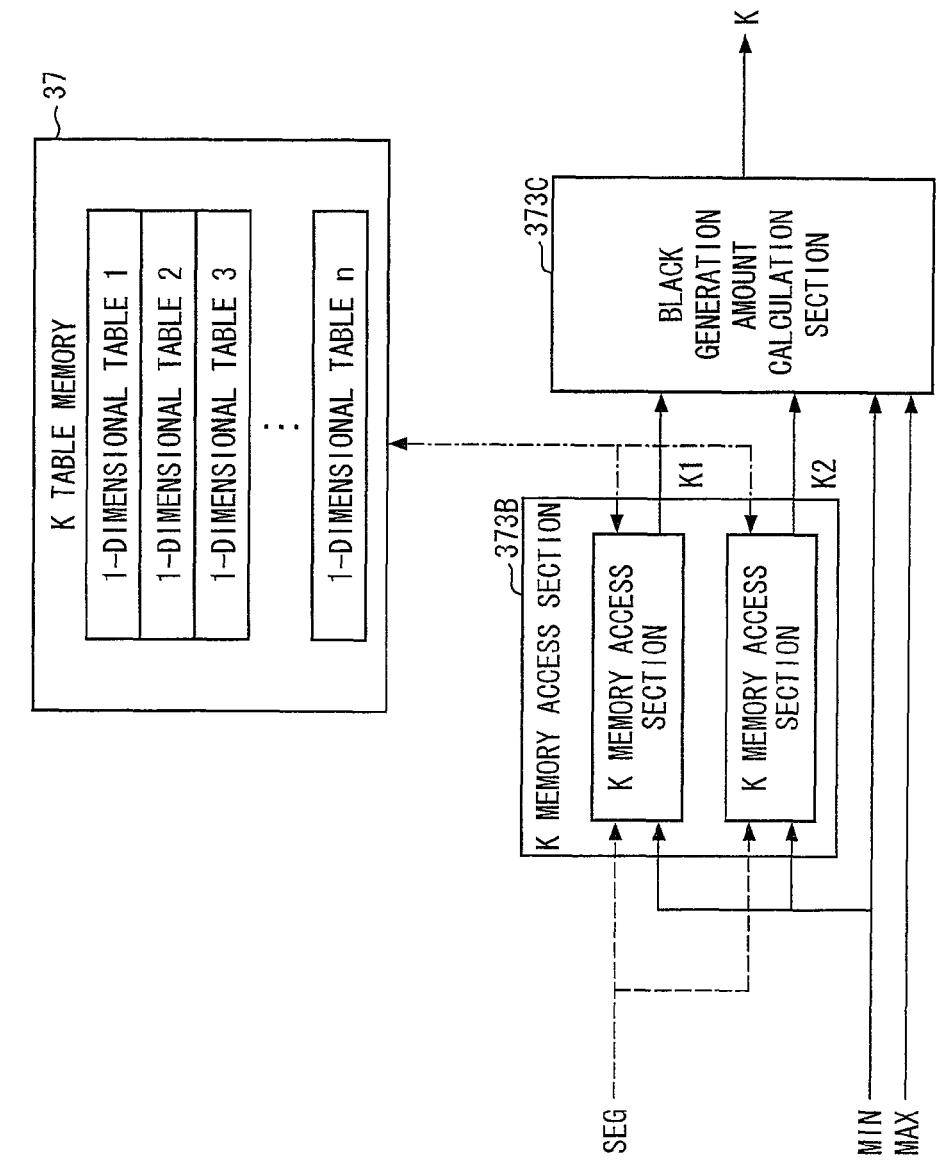
FIG. 5 is a block diagram illustrating a configuration of a black generation amount calculation section.

FIG. 1 is a block diagram illustrating a configuration of an image forming apparatus according to one embodiment of the present invention. The image forming apparatus includes: a color image input apparatus 10; a color image processing apparatus (an image processing apparatus) 30; and a color image output apparatus 50.

The color image input apparatus 10 may be, for example, a flat-bed type scanner with a CCD (Charged Coupled Device), a film scanner, a digital camera, a cellular telephone or the like. The color image input apparatus 10 obtains a reflected light image from a color image of a document as RGB analog signals and outputs the RGB signals to the color image processing apparatus 30.

The color image output apparatus 50 may be, for example, an inkjet or electrophotographic printer. The color image output apparatus 50 receives a color image composed of CMYK signals from the color image processing apparatus 30 and forms the color image on a recording paper. The color image output apparatus 50 is not limited to the printer and may be a CRT monitor device or a liquid crystal monitor device. In this case, the received CMYK signals are converted into RGB signals so as to be processable in the monitor device.

The color image processing apparatus 30 processes the RGB signals which are color information of the color image obtained from the image input apparatus 10, and outputs the color image composed of CMYK signals to the color image output apparatus 50. The color image processing apparatus 30 is configured by an ASIC (Application Specific Integrated Circuit) and comprises: an A/D conversion section 31; a shading correction section 32; an input tone correction section 33; an automatic document type discrimination section 34; a segmentation process section 35; a color correction section 36; a black generation and under color removal section 37; a spatial filter process section (an image processing section) 38; an output tone correction section 39; a tone reproduction process section (an image processing section) 40; and a control section (not illustrated) which controls the above-mentioned sections.

The A/D conversion section 31 converts the RGB analog signals of the color image obtained from the color image input apparatus 10 into RGB digital signals of, for example, 10 bits, and outputs the converted RGB signals to the shading correction section 32.

The shading correction section 32 carries out on the RGB signals received from the A/D conversion section 31 a correction process for removing distortions produced in an illumination system, an image focusing system, or an image sensing system of the image input apparatus. The shading correction section 32 outputs the processed RGB signals to the input tone correction section 33.

The input tone correction section 33 carries out a color balance adjustment on the RGB signals received from the shading correction section 32, converts the RGB signals of 10 bits into 8 bits, and outputs the converted RGB signals of 8 bits to the automatic document type discrimination section 34.

The automatic document type discrimination section 34 discriminates, according to the RGB image data (RGB color density (pixel value) signals) that has been subjected to the process such as a gamma correction in the input tone correction section 33, a type of the document read in the image input apparatus 10. Here, document types that the automatic document type discrimination section 34 discriminates include a text document, a printed photo document, a text/printed photo document in which text and printed photo (halftone photograph) are mixed, and the like. Further, the automatic document type discrimination section 34 carries out, based on the image data, an ACS (Automatic Color Selection) that is a process for determining whether the read document is a color or monochrome document. The automatic document type discrimination section 34 can also carry out a process for determining whether or not the read document is a blank document (a blank page document). The RGB image data to be outputted from the automatic document type discrimination section 34 is configured to be inputted into the segmentation process section 35. And, a result of the document type discrimination carried out by the automatic document type discrimination section 34 is outputted as a document type discrimination signal. The document type discrimination signal is inputted into the color correction section 36, the black generation and under color removal section 37, the spatial filter process section 38, and the tone reproduction process section 40.

According to the RGB image data transmitted from the automatic document type discrimination section 34, the segmentation process section 35 determines whether pixels of the input image are of chromatic or achromatic color and which image region the each pixel is segmented into, and carries out a process for generating a segmentation class signal indicating a segmentation result. Here, the image regions into which the each pixel is segmented by the segmentation process section 35 include a black text region, a color text region, a halftone region, a photograph region (continuous tone region) and the like. Further, the segmentation process may be carried out in a manner such that an image region is segmented for each block composed of a plurality of pixels, instead of each pixel. The segmentation class signal outputted from the segmentation process section 35 is inputted into the color correction section 36, the black generation and under color removal section 37, the spatial filter process section 38, and the tone reproduction process section 40.

The color correction section 36 converts the RGB signals received from the segmentation process section 35 into CMY color spaces, then carries out a color correction depending on the characteristic of the color image output apparatus 50, and outputs the corrected CMY signals to the black generation and under color removal section 37.

The black generation and under color removal section 37 generates a K (black) signal according to the CMY signals received from the color correction section 36, and then generates CMYK signals including the generated K signal, and outputs the generated CMYK signals to the spatial filter process section 38. For example, when the black generation and under color removal section 37 carries out a black generation process with skeleton black, the black generation and under color removal process can be expressed as the following formula (1):

$$\begin{cases} K' = f\{\min(C, M, Y)\} \\ C' = C - \alpha K' \\ M' = M - \alpha K' \\ Y' = Y - \alpha K' \end{cases} \quad (1)$$

where y=f(x) represents an input-output characteristics of a skeleton black; C, M and Y represent data to be inputted; C', M', Y' and K' represent data to be outputted; and $\alpha(0<\alpha<1)$ represents an UCR (Under Color Removal) rate. The detail of the black generation and under color removal section 37 according to the present invention will be described later.

The spatial filter process section 38 carries out a spatial filter process using a digital filter on the CMYK signals received from the black generation and under color removal section 37, according to the segmentation class signal which is received from the segmentation process section 35 and synchronized with the CMYK signals. In this way, the spatial filter process section 38 corrects the spatial frequency characteristic of the image and outputs the corrected CMYK signals to the output tone correction section 39. For example, the spatial filter process section 38 can carry out a sharpening process (enhancement process) or a smoothing process on the CMYK signals.

When a document is discriminated as a specified document type (e.g., a printed photo document or a text/printed photo document that includes black halftones) by the automatic document type discrimination section 34, or when a specified document type mode (e.g., a map document mode) is manually selected on an operation panel, alternatively with respect to a pixel that is determined, according to a result of the segmentation, to belong to a halftone region and to be of an achromatic color, the spatial filter process section 38 carries out the process as follows.

If a sharpening process (enhancement process) is carried out in a less enhanced manner and a smoothing process is carried out in a more enhanced manner, unevenness in density (line noise) occurred due to color misregistration among RGB of the image input apparatus can be suppressed, however, the above processes would cause an output image to blur. If a tone reproduction process which will be explained later is replaced with an error diffusion process, the production of a moire caused by halftones or line screens of a document and a dithering process would be prevented. Accordingly, in order to clearly indicate small texts (color text which is composed of halftones) on a map, it is preferable to carry out the sharpening process (enhancement process) in a more enhanced manner. In this case, unevenness in density occurred due to color misregistration among RGB of the image input apparatus can be suppressed by a black generation and under color removal process which will be explained later. That is, the black generation and under color removal process according to the present embodiment has a precondition of carrying out of an enhancement process in the spatial filter process section 38 and an error diffusion process in the tone reproduction process section.

Although the example in which the process carried out in the spatial filter process is switched (selected) according to a result of the document type discrimination or a segmentation class signal has been described, an enhancement process may be carried out without being switched.

The output tone correction section 39 carries out on the CMYK signals received from the spatial filter process section an output tone correction process depending on the characteristic of the color image output apparatus 50, and outputs the processed CMYK signals to the tone reproduction process section 40.

The tone reproduction process section 40 receives the CMYK signals for each pixel from the output tone correction section 39 and serially carries out error diffusion processes. The same error diffusion process may be carried out on all of the pixels, or the error diffusion processes may serially be carried out on the CMYK signals according to the segmentation class signal which is received from the segmentation process section 35 and synchronized with the CMYK signals.

For example, when the segmentation class signal indicates a text region or a halftone region of a chromatic color or an achromatic color, the tone reproduction process section 40 carries out an error diffusion process suitable for a reproduction of a high-frequency component on the CMYK signals with which the segmentation class signal is synchronized. FIG. 2 shows an example of diffusion coefficients for the error diffusion process. This process improves the text reproducibility of a text region, and does not significantly deform the condition of a halftone region, and clearly reproduces small texts and texts with many stroke count, which cannot be segmented into the text region. Also, when the segmentation class signal indicates a photograph region, the tone reproduction process section 40 carries out an error diffusion process suitable for a tone reproduction of a photograph by a color image output apparatus on the CMYK signals with which the segmentation class signal is synchronized. An example of diffusion coefficients for the error diffusion process is shown in FIG. 3. The figure shows four sets of diffusion coefficients (a) to (d), and a set of diffusion coefficients to be used for each pixel are changed, according to a random number.

Although the example in which an error diffusion process is used in a tone reproduction process to carry out a halftone process is illustrated, a dithering process may be used when a document type is discriminated as a photograph document, for example.

Also, the tone reproduction process section 40 outputs the processed CMYK signals to an external memory or an RAM (not illustrated). The external memory, etc. stores the received CMYK signals and outputs it to the image output apparatus according to an image forming instruction by the control section. The image output apparatus prints out an image of the image data on a recording medium (such as paper).

[Detail of a Black Generation and Under Color Removal Section]

Now, the detail of the black generation and under color removal section 37 is described. The black generation and under color removal process which will be described below is a well-known method as disclosed, for example, in Japanese Patent Application Publication No. Tokukai 2006-115220. However, the method of the present invention for calculating a black generation amount and an under color removal amount in the black generation and under color removal process is not limited to this well-known method, and other well-known methods may also be applied.

Figure 10:
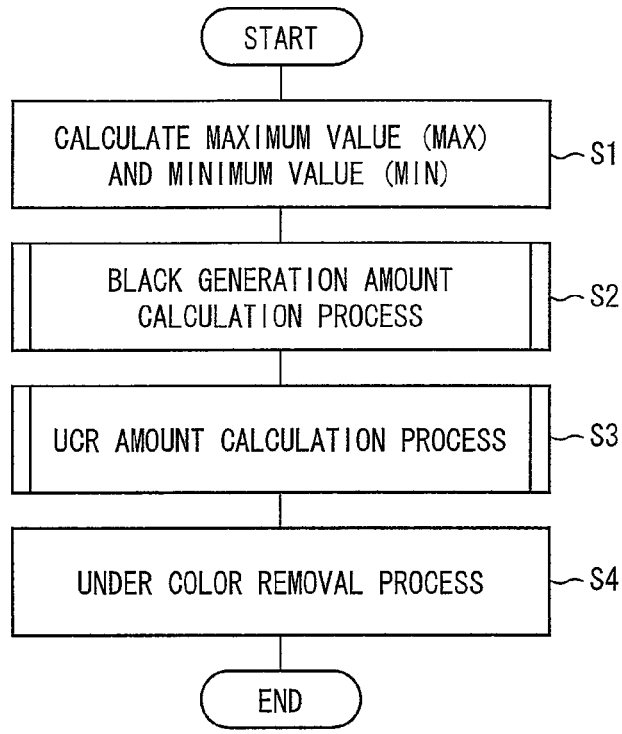
FIG. 10 is a flow chart illustrating steps of a black generation and under color removal process.
Figure 11:
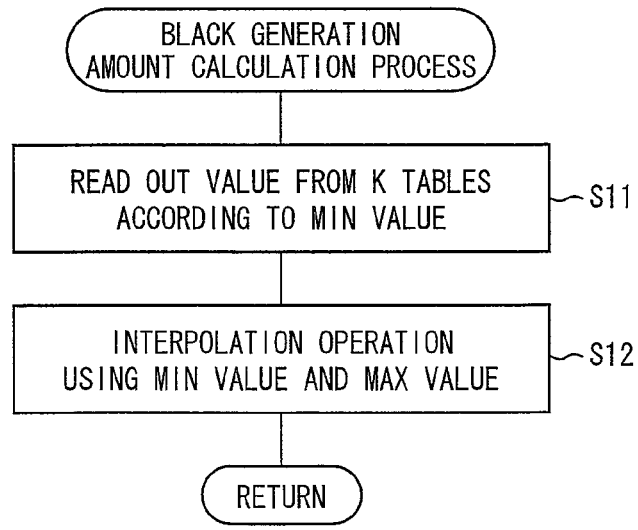
FIG. 11 is a flow chart illustrating steps of a black generation amount calculation process.
Figure 15:
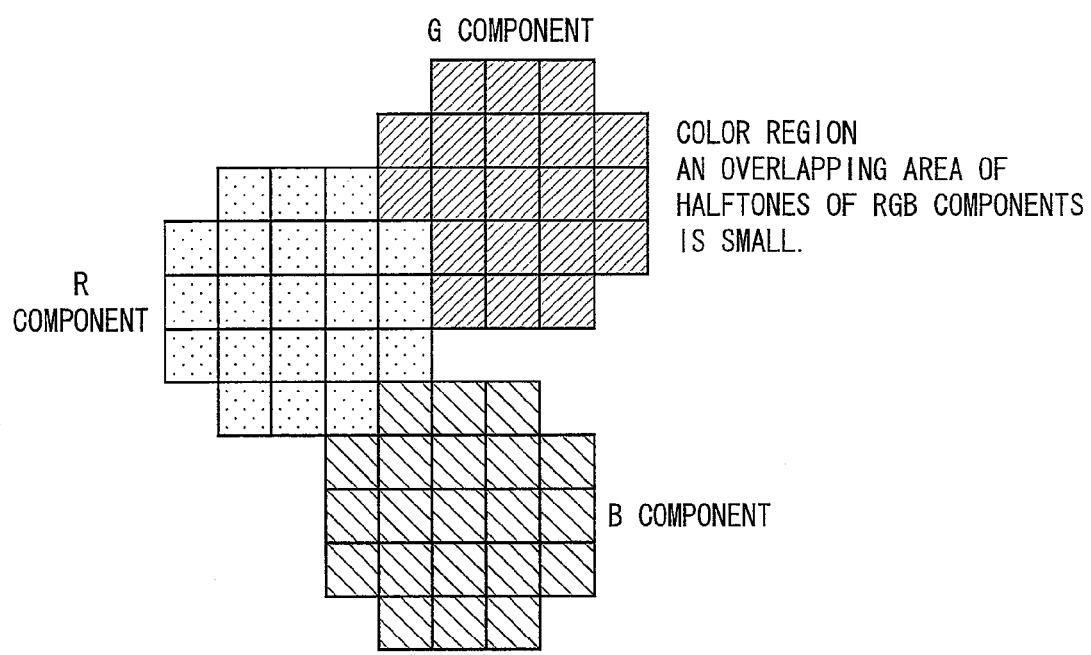
FIG. 15 illustrates a color halftone region.

FIG. 4 is a block diagram illustrating a configuration of the black generation and under color removal section 37. And FIGS. 10 to 12 are flow charts illustrating the black generation and under color removal process. As shown in FIG. 4, the black generation and under color removal section 37 comprises: a maximum and minimum values calculation section 371; an UCR amount calculation section 372; a black generation amount calculation section 373; and an UCR process section 374. Here, CMY signals to be inputted from the color correction section 36 are defined as ($C_0$, $M_0$, $Y_0$), and CMYK signals to be outputted from the black generation and under color removal section 37 are defined as ($C_1$, $M_1$, $Y_1$, $K_1$).

The maximum and minimum values calculation section 371 calculates maximum and minimum values of color components in the CMY signals ($C_0$, $M_0$, $Y_0$) (S1), defines the maximum and minimum values as MAX and MIN, respectively, and outputs them to the UCR amount calculation section 372 and the black generation amount calculation section 373, respectively.

Subsequently, an under color removal amount UCR and a black generation amount K are calculated in the UCR amount calculation section 372 and the black generation amount calculation section 373, respectively (S2, S3). These calculation methods will be explained later.

In the UCR process section 374, an under color removal process is carried out, wherein the UCR amount calculated in the UCR amount calculation section 372 is subtracted from the $C_0 M_0 Y_0$ signals using a formula below (S4). And then $C_1 M_1 Y_1$ signals obtained by the calculation are outputted for a downstream processing. And the black generation amount K is directly used as the $K_1$ signal.

$C_1 = C_0 - \text{UCR}$ $M_1 = M_0 - \text{UCR}$ $Y_1 = Y_0 - \text{UCR}$ $K_1 = K$

[Detail of a Black Generation Amount Calculation Section]

In the UCR amount calculation section 372 and the black generation amount calculation section 373, lookup tables (referred hereinafter to as LUTs) are generally used to calculate a black generation amount K and an under color removal amount UCR, respectively. The calculations of the black generation amount K and the under color removal amount UCR are performed by methods which are substantially identical except in that a K table or an UCR table is used as LUT. Accordingly, only the black generation amount calculation section 373 will be explained below (step numbers in the flow charts indicate the process in the UCR amount calculation section 372 as well).

FIG. 5 is a block diagram illustrating the black generation amount calculation section 373. The black generation amount calculation section 373 comprises: a K table memory 373A in which black generation tables are stored; K memory access sections 373 B that read out two values from the K table memory 373A in accordance with a segmentation class signal SEG and a MIN signal; and a black generation amount calculation section 373C that calculates a black generation amount K using the $K_1$ and $K_2$ values that are read out, and the MIN signal and a MAX signal.

As shown in FIG. 5, the K table memory 373 A is provided with 1-dimensional table 1 (LUT1) to 1-dimensional table n (LUTn), any two of which are selected according to the segmentation class signal SEG.

In the K memory access sections 373B, two 1-dimensional tables LUT1 and LUT2 are selected from the K table memory according to the segmentation class signal SEG, and values from the selected two K tables are read out according to the MIN signal (S11, S21). The value which is read out from the LUT1 is defined as K1 and the value which is read out from the LUT2 is defined as K2, and the values are outputted to the black generation amount calculation section 373C.

In the black generation amount calculation section 373C, an interpolation operation is carried out using the K1 and K2 signals, and the MIN and MAX signals according to Formula (2) (S12, S22) to calculate a black generation amount K (a second black generation amount). The black generation amount K is then outputted for a downstream processing.

$$K = \frac{(255 - \text{MAX})K1 + (\text{MAX} - \text{MIN})K2}{255 - \text{MIN}} \quad (2)$$

The black generation amount K may be calculated by, instead of a linear interpolation, an interpolation operation on a curve passing through the K1 and K2 according to a formula in which a change condition is set beforehand.

[Selection of Table]

Two 1-dimensional tables to be selected from the K table memory 373A can be changed according to a result of the segmentation, as shown in FIG. 5.

For example, depending on whether the segmentation class signal SEG indicates a text region or a region other than the text region, table numbers to be selected from the K table memory and referenced in the two K memory access sections are respectively decided. Table values of the respective table numbers that correspond to a MIN signal are respectively extracted as the above-mentioned black generation amounts K1, K2 which are first black generation amounts (or under color removal amounts).

However, when the segmentation class signal indicates a text region, first black generation amounts of the same table number are outputted in the two K memory access sections in order that the first black generation amounts can be extracted independently of the value of a MAX signal. Accordingly, the two K memory access sections extract the same table value and the interpolation results are also same as the table value. Assuming that the first black generation amount is K3, the above Formula (2) is varied to Formula (3) below to output a value of the first black generation amount.

$$K = \frac{(255 - \text{MAX})K1 + (\text{MAX} - \text{MIN})K2}{255 - \text{MIN}} = K3 \quad (3)$$

In this way, by changing a 1-dimensional table to be referenced according to a segmentation class signal, a black generation amount depending on each region can be obtained using the same circuit and the same calculation method. That is to say, in the same circuit and in the same calculation method, 2-dimensional information can be used with respect to a halftone or photograph region and 1-dimensional information can be used with respect to a text region, in order to obtain a black generation amount.

As described above, the black generation amount calculation section 373 shown in FIG. 5 calculates a black generation amount from two 1-dimensional tables, wherein the black generation amount can 2-dimensionally be calculated (the black generation amount can be changed depending on whether a document is of a chromatic or achromatic color).

Figure 6:
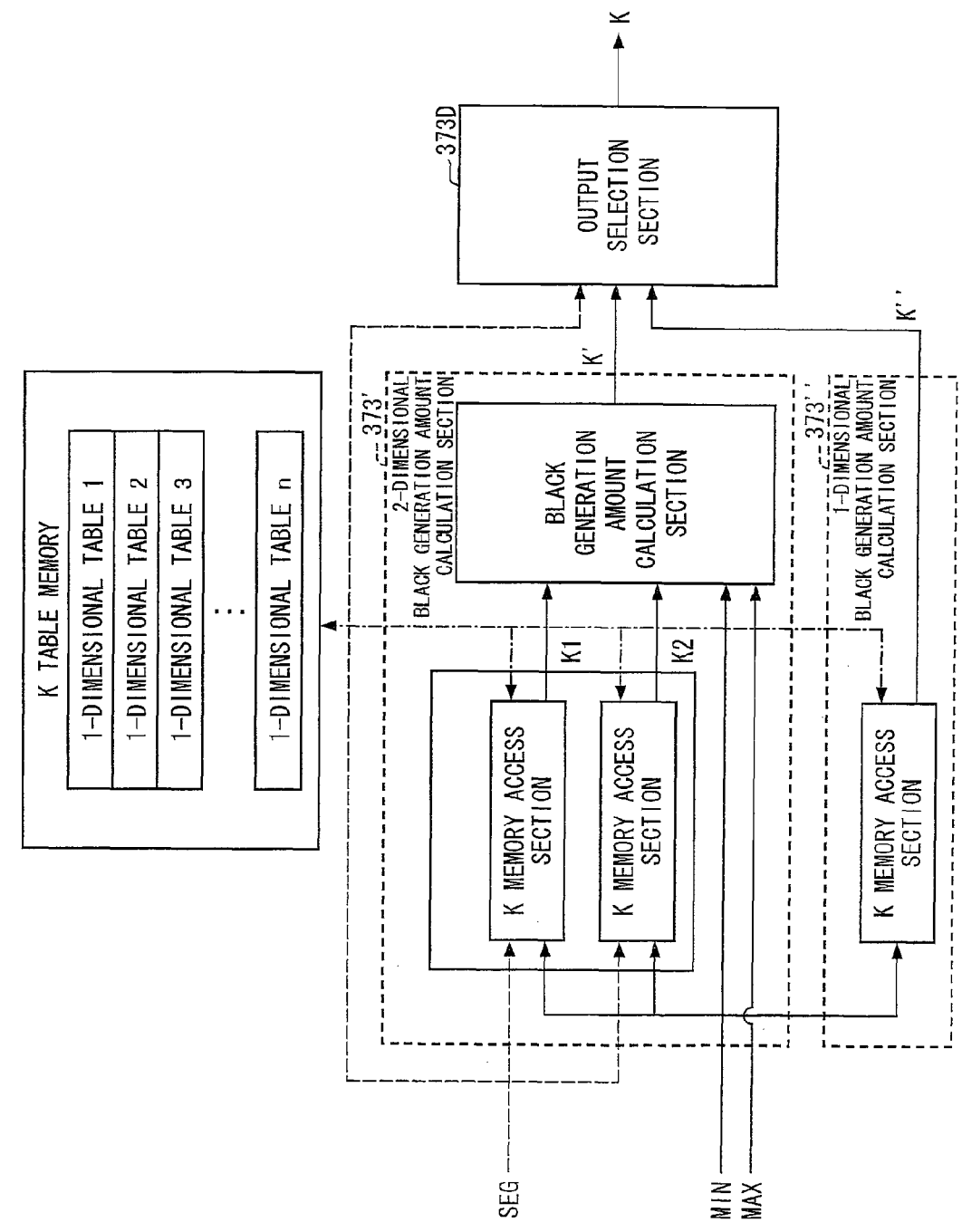
FIG. 6 is a block diagram illustrating a configuration of a black generation amount calculation section.

A variation of a black generation amount calculation section 373 is shown in FIG. 6, which comprises: a 2-dimensional black generation amount calculation section 373'; a 1-dimensional black generation amount calculation section 373"; and an output selection section 373D. The 2-dimensional black generation amount calculation section 373' is configured to be identical with the black generation amount calculation section 373 shown in FIG. 5, wherein a black generation amount calculated in the 2-dimensional black generation amount calculation section 373' is defined as a first black generation amount K'.

The 1-dimensional black generation amount calculation section 373" reads out a 1-dimensional table from the K table memory using a MIN signal and extracts a table value of the table which is read out, the table value corresponding to the MIN signal. In the 1-dimensional black generation amount calculation section 373", the extracted table value is directly outputted as a second black generation amount K". In the 1-dimensional black generation amount calculation section 373", a 1-dimensional table is used, so that a black generation amount cannot be changed depending on whether a document is of a chromatic or achromatic color, and thus the black generation amount is only 1-dimensionally calculated.

The first black generation amount K' and the second black generation amount K" are inputted into the output selection section 373D. The output selection section 373D selects one of the black generation amounts in reference to a segmentation class signal SEG, and output the selected black generation amount as a black generation amount K.

The black generation amount calculation section 373 in the present invention may be configured in which it comprises only the 1-dimensional black generation amount calculation section 373".

In the 2-dimensional black generation amount calculation section shown in FIG. 5 or 6, two of the 1-dimensional tables can be changed depending on a document type or an image mode selected through the input on an operation panel (such as a text document mode, a text/printed photo document mode and the like). In this case, instead of a segmentation class signal SEG, a signal indicating a document type or an image mode can be inputted. In this way, 1-dimensional tables to be referenced can be changed according to a document type or an image mode. The above description of the black generation amount calculation section is to be applied to the UCR amount calculation section.

[K and UCR Tables in a Specified Document Type]

The present invention is to suppress unevenness in density (line noise) occurred due to color misregistration in RGB components. As described above, such unevenness in density occurs dominantly in a specified document type. Therefore, an image processing apparatus according to the present embodiment is characterized in that unevenness in density is suppressed in a specified document type in which unevenness in density is likely to occur, by not performing or by reducing a black generation and under color removal process.

Accordingly, in the present invention, when a document is discriminated as a specified document type (such as a printed photo document including black halftones) by the automatic document type discrimination section 34, or when a predetermined document type mode (such as a map document mode) is manually selected on an operation panel, any one of combinations of a K table and an UCR table as shown in (A) to (C) below are selected to execute a non-uniform image suppressing operation mode.

(A) Always K=0, UCR=0

When such K and UCR tables are selected, a black generation and under color removal process is substantially not carried out.

(B) K and UCR are at a Minimum (see FIGS. 7 (*a*) and (*b*))

When such K and UCR tables are selected, a black generation and under color removal process is not carried out and only the CMY is outputted when a MIN value is equal to or less than a predetermined threshold, whereas when the MIN value exceeds the predetermined threshold, the black generation and under color removal process is carried out only on a portion where the MIN value exceeds the predetermined threshold. That is, a minimum extent of the black generation and under color removal process is carried out.

Here, when a black generation amount calculation section is a 2-dimensional black generation amount calculation section, the tables are selected in a manner such that the input-output characteristics as shown in FIG. 7 (*a*) or (*b*) results. FIG. 7(*a*) is a graph illustrating a black generation amount, an UCR amount, and a CMY output value in accordance with an achromatic color component (MIN value) of CMY signals (a chromatic color component of CMY values is not taken into consideration), wherein K and UCR tables are selected in a manner such that output is made in accordance with the graph of FIG. 7(*a*). On the other hand, FIG. 7 (*b*) is a graph illustrating a black generation amount, an UCR amount, and a CMY output value, taking into consideration an chromatic color component of CMY signals (color density values of two colors of CMY three-colors are defined as "255", and a color density value of the remaining one color can be changed), wherein K and UCR tables are selected in a manner such that output is made in accordance with the graph of FIG. 7(*b*).

When a black generation amount calculation section is a 1-dimensional black generation amount calculation section, no determination of whether a document is of a chromatic or achromatic color is carried out, K and UCR tables are selected in a manner such that output is always made in accordance with the graph of FIG. 7 (*b*).

In the example of FIG. 7(*a*), a threshold of a MIN value that is a reference point for determining whether or not a black generation and under color removal is carried out is 222. That is, when the MIN value is equal to or less than 222, no black generation is carried out and only the CMY is outputted, and when the MIN value is equal to or more than 223, the black generation and under color removal is carried out only on a portion where the MIN value exceeds the threshold. And, in the example of FIG. 7(*b*), a threshold of a MIN value that is a reference point for determining whether or not a black generation and under color removal is carried out is 190. That is, when the MIN value is equal to or less than 190, no black generation is carried out and only the CMY is outputted, and when the MIN value is equal to or more than 191, the black generation and under color removal is carried out only on a portion where the MIN value exceeds the threshold.

Figure 8:
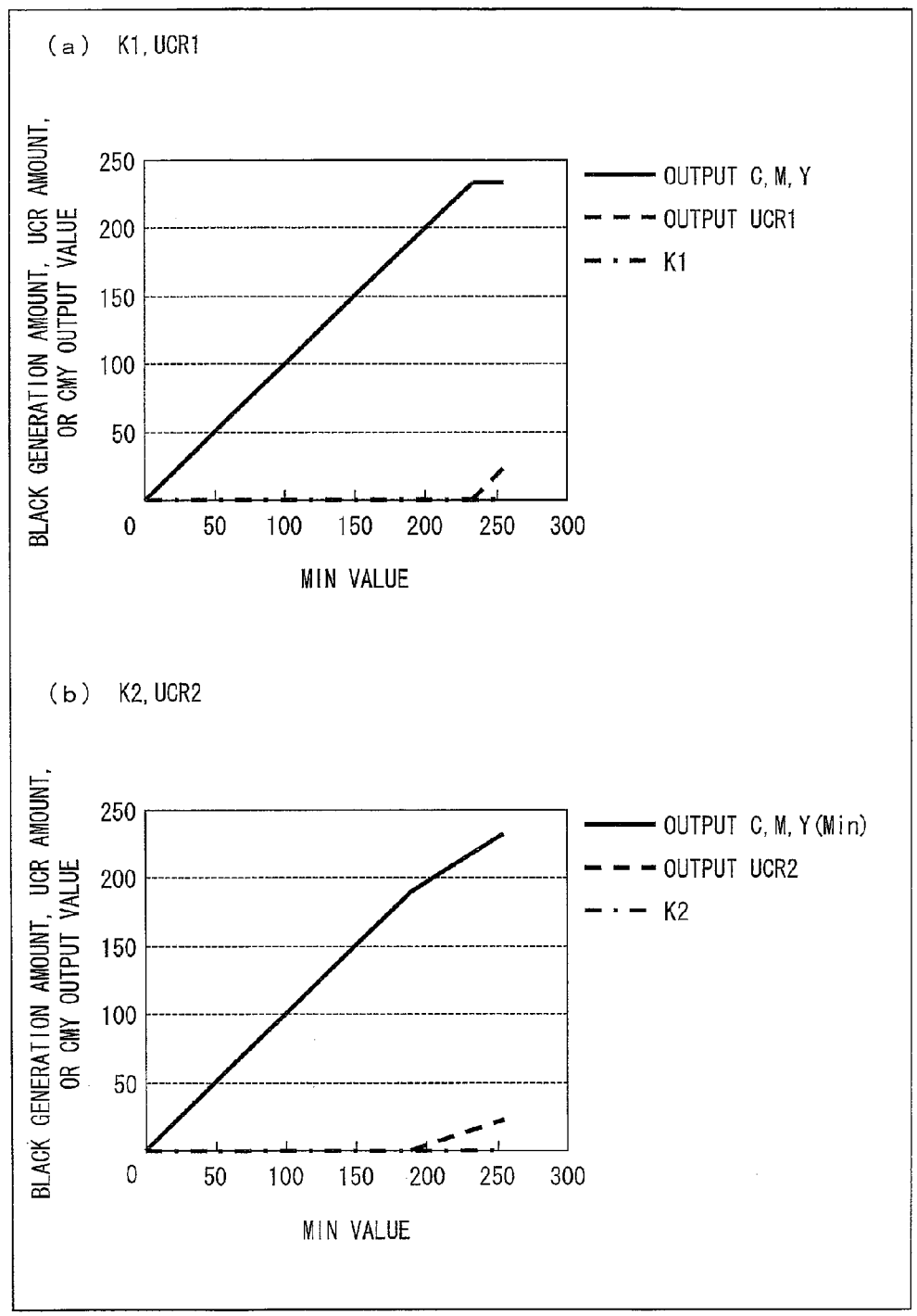
FIG. 8 is a graph illustrating a black generation amount, an UCR amount and a CMY output value when the non-uniform image suppressing operation mode according to the present invention is executed, wherein no black generation is carried out and a small amount of an UCR is generated.

(C) K=0, an UCR is at a Minimum (see FIGS. 8(*a*) and (*b*))

When such K and UCR tables are selected, a black generation process is not always carried out, but when a MIN value exceeds the predetermined threshold, an under color removal process is carried out only on a portion where the MIN value exceeds the threshold.

Here, when a black generation amount calculation section is a 2-dimensional black generation amount calculation section, tables are selected in a manner such that the input-output characteristics as shown in FIG. 8 (*a*) or (*b*) results. FIG. 8(*a*) is a graph illustrating a black generation amount, an UCR amount and a CMY output value in accordance with an achromatic color component (MIN value) of CMY signals (a chromatic color component of CMY values is not taken into consideration), wherein K and UCR tables are selected in a manner such that output is made in accordance with the graph of FIG. 8(*a*). On the other hand, FIG. 8 (*b*) is a graph illustrating a black generation amount, an UCR amount and a CMY output value, taking into consideration an chromatic color component of CMY signals (color density values of two colors of CMY three-colors are defined as "255", and a color density value of the remaining one color can be changed), wherein K and UCR tables are selected in a manner such that output is made in accordance with the graph of FIG. 8(*b*).

When a black generation amount calculation section is a 1-dimensional black generation amount calculation section, no determination of whether a document is of a chromatic or achromatic color is carried out, K and UCR tables are selected in a manner such that output is always made in accordance with the graph of FIG. 8 (*a*).

In the example of FIG. 8(*a*), a threshold of a MIN value that is a reference point for determining whether or not an under color removal is carried out is 233. That is, when the MIN value is equal to or less than 233, no under color removal process is carried out and only the CMY is outputted, and when the MIN value is equal to or more than 234, an under color removal process is performed only on a portion where the MIN value exceeds the threshold. And, in the example of FIG. 8(*b*), a threshold of a MIN value that is a reference point for determining whether or not an under color removal process is performed is 190. That is, when the MIN value is equal to or less than 190, no under color removal process is carried out and only the CMY is outputted, and when the MIN value is equal to or more than 191, the under color removal is carried out only on a portion where the MIN value exceeds the threshold.

In the above-mentioned operation mode (a), unevenness in density occurred due to color misregistration in RGB components is most effectively suppressed. However, since a black generation and under color removal process is not at all carried out, amount of toner or ink to be used in the image output apparatus is increased and it may cause a defect on the image output apparatus or output medium.

For example, when a black solid image is outputted, almost three times as much toner or ink is used in the operation mode (A) relative to that when the image is outputted only in a black toner or ink. In the case of printing using toner, too much amount of toner used may cause a toner offset where the toner gets stuck to a fuser roller, or a defect where recoding paper after a fusing is curled. And, in the case of printing using ink, too much amount of ink used would provide the recoding paper with too much water and may cause a defect in which a crinkle occurs in the recording paper after the ink is dried.

Accordingly, the operation mode (A) can be used when a high performance image output apparatus is used and no defect is caused. Otherwise it is preferable to use the operation mode (B) or (C) to suppress maximum amount of toner or ink to be used so that such a defect is prevented even if any image is outputted.

Figure 9:
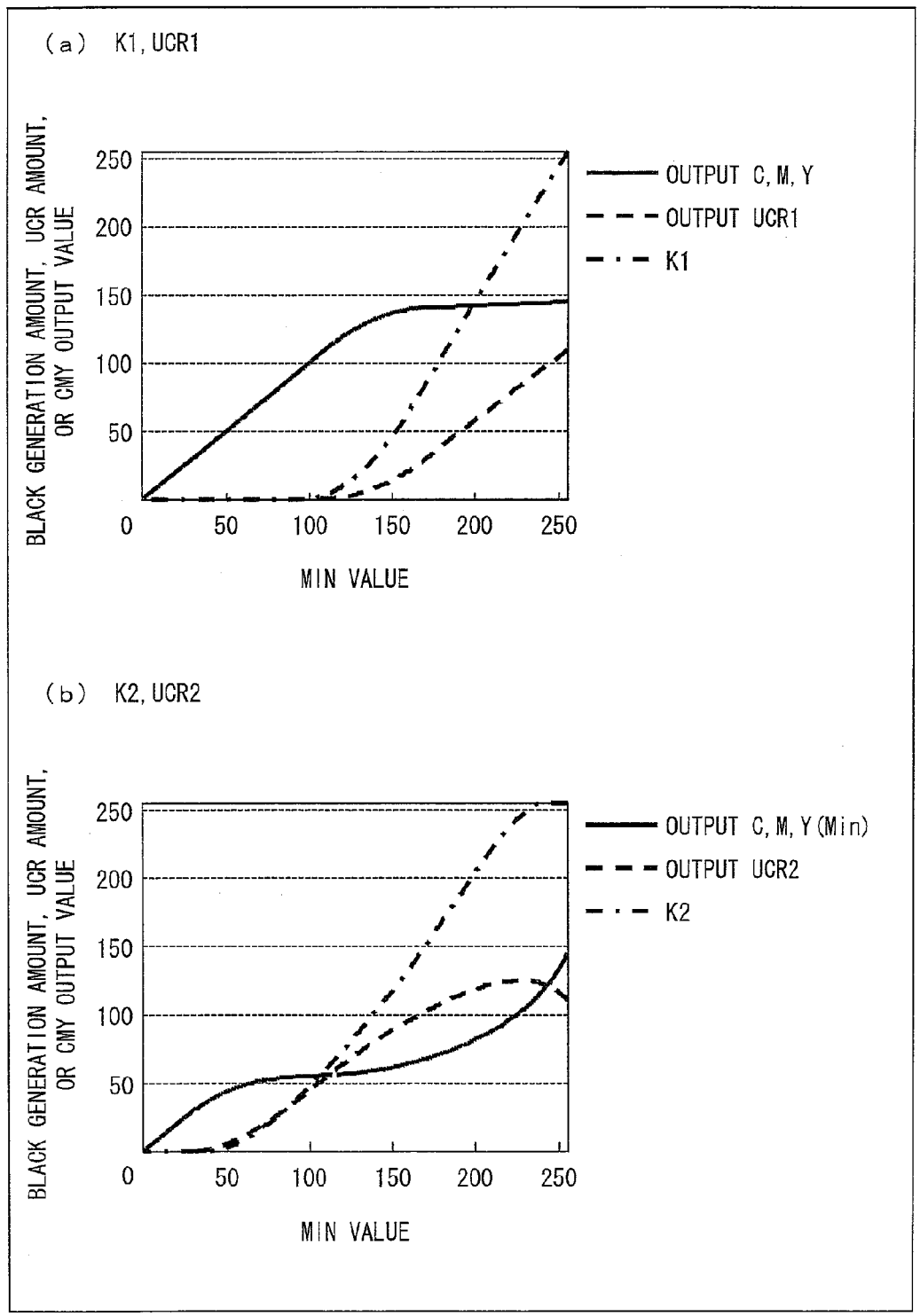
FIG. 9 is a graph illustrating a black generation amount, an UCR amount and a CMY output value when the non-uniform image suppressing operation mode according to the present invention is not executed.

FIG. 9 illustrates a black generation amount, an UCR amount and an output value when the above-mentioned operation modes are not executed. FIG. 9 (*a*) is a graph illustrating a black generation amount, an UCR amount and a CMY output value in accordance with an achromatic color component (MIN value) of CMY signals, and FIG. 9 (*b*) is a graph taking into consideration an chromatic color component of CMY signals. In the example of FIG. 9(*a*), thresholds which are reference points for determining whether or not a black generation process and an under color removal process are carried out are 101 and 115, respectively. That is, when a MIN value is equal to or less than 101, no black generation process is carried out and only the CMY is outputted, and when the MIN value is equal to or more than 102, the black generation process is carried out only on a portion where the MIN value exceeds the threshold. And, when the MIN value is equal to or less than 115, no under color removal process is carried out and only the CMY is outputted, and when the MIN value is equal to or more than 116, the under color removal process is carried out on a portion where the MIN value exceeds the threshold.

In the example of FIG. 9(*b*), thresholds which are reference points for determining whether or not a black generation process and an under color removal process are carried out are 41 and 31, respectively. That is, when a MIN value is equal to or less than 41, no black generation process is carried out and only the CMY is outputted, and when the MIN value is equal to or more than 42, a black generation process is carried out only on a portion where the MIN value exceeds the threshold. And when the MIN value is equal to or less than 31, no under color removal process is carried out and only the CMY is outputted, and when the MIN value is equal to or more than 32, the under color removal is carried out only on a portion where the MIN value exceeds the threshold.

Accordingly, when the operation modes are executed, thresholds which is reference points for determining whether or not a black generation process and an under color removal process are carried out are set to values larger than that in a case in which the operation modes are not executed.

The outputs of C, M, Y in the graph of FIGS. 7(*a*), 8(*a*) and 9(*a*) represent respective values of C, M, Y after carrying out the under color removal process, and the outputs of C, M, Y (min) in the graph of FIGS. 7(*b*), 8(*b*) and 9(*b*) represent output values of minimum values (CMY) after carrying out the under color removal (that indicate one color of CMY three-colors two of which are defined as "255").

[An Example of a Document Type Discrimination Method]

Here, a method for discriminating a document type is described. The method is well known as disclosed, for example, in Japanese Patent Application Publication No. Tokukai-2002-232708. In the method, steps (1) to (7) can be used to discriminate among a page-background region, a photograph region, a text region and a halftone region, and steps (8) and (9) can be used to discriminate whether the document is of a chromatic or achromatic color. It should be noted, however, the method for discriminating a document type in the present invention is not limited to the above-mentioned method and any other well-known method can be applied.

(1) A minimum color density value and a maximum color density value in an n×m (e.g., 7×15) block including a target pixel are calculated.

(2) A maximum color density difference is calculated using the calculated minimum and maximum color density values.

(3) A total color density busyness (such as the sum total of values calculated in a main-scanning direction and a sub-scanning direction) is calculated, the total color density busyness being the sum total of absolute values of color density differences between adjacent pixels.

(4) The calculated maximum color density difference is compared with a maximum color density difference threshold, and the total color density busyness is compared with a total color density busyness threshold. When the maximum color density difference<the maximum color density difference threshold, and the total color density busyness<the total color density busyness threshold are applied, the target pixel is determined to belong to the page-background/photograph region. When the above condition is not met, the target pixel is determined to belong to the text/halftone region.

(5) With respect to the pixels determined to belong to the page-background/photograph region, the pixels are determined to be page-background pixels when the target pixel satisfies the condition of the maximum color density difference<a page-background/photograph discrimination threshold, whereas the pixels are determined to be photograph (photograph region, continuous tone region) pixels when the target pixel does not satisfy the above condition.

(6) With respect to the pixels determined to belong to the text/halftone region, the pixels are determined to be text pixels when the target pixel satisfies the condition of the total color density busyness<a product of the maximum color density difference and a text/halftone discrimination threshold, whereas the pixels are determined to be halftone pixels when the target pixel does not satisfy the above condition.

(7) The numbers of the pixels determined to belong to the page-background region, the photograph region, the text region, and the halftone region are respectively counted and the counted numbers are respectively compared with thresholds predetermined for the page-background region, the photograph region, the halftone region, and the text region, in order to discriminate a type of the entire document. Assuming that, for example, detection accuracy is higher in the text region, the halftone region, and the photograph region in this order, the document is discriminated as a text document when a ratio of the pixels of the text region to the total number of pixels is 30% or more, the document is discriminated as a halftone document (printed photo document) when a ratio of the pixels of the halftone region to the total number of pixels is 20% or more, and the document is discriminated as a photograph document when a ratio of the pixels of the photograph region to the total number of pixels is 10% or more. And, the document is discriminated as a text/halftone document (a text/printed photo document) when the ratios of the pixels of the text region and the halftone region exceed respective thresholds.

(8) In parallel with the above steps, a discrimination of whether the document is of a chromatic or achromatic color is carried out, using:

a method for comparing the difference between a maximum value and a minimum value of RGB signals with a threshold THa.

$$\max(R,G,B)-\min(R,G,B) \geq THa (e.g., 20); \text{ or}$$

a method for obtaining the absolute values of the differences among respective color components of RGB signals and comparing them with thresholds.

(9) The number of the pixels of the document which are discriminated as a printed photo document or a text/printed photo document in the step (7) and determined to be halftones of an achromatic color is counted, in which, when the number is equal to or more than a threshold THb, it is discriminated that the printed photo document or the text/printed photo document is a document including halftones of an achromatic color (for example, when a resolution in a main-scanning direction and a sub-scanning direction is 600 dpi, THb=50000. In this resolution, the number of pixels in 1 $cm^2$ is 55800, and when the document has black halftones of 1 $cm^2$, the printed photo document or the text/printed photo document is discriminated as including black halftones).

The document type discrimination only requires discriminating a document type. Accordingly, when pixels are determined for example, the document type discrimination may be carried out exclusively for pixels which can surely be segmented, except for pixels having a feature value in the vicinity of a threshold.

[An Example of Segmentation Method]

Segmentation is carried out, for example, by using the steps (1) to (6) of the document type discrimination method. And the step (8) for the determination of a chromatic/achromatic color is carried out to determine whether or not halftones are of an achromatic color. The determination of a chromatic/achromatic color may be used to determine whether the text is a black or color text. For example, when the segmentation is carried out, the threshold for determining the pixels is changed according to a result of the document type discrimination, in order to improve the determination accuracy.

In the image processing apparatus described above, the document type discrimination is carried out, and, with respect to a document type in which unevenness in density is likely to occur, an operation mode (any one of the operation modes (A) to (C) described in the caption [K and UCR Tables in a Specified Document Type]) where a black generation and under color removal is not carried out or reduced in order to suppress unevenness in density is executed.

However, the present invention is not limited to the above-mentioned aspect, and the present invention may have another aspect in which a user can manually set an operation mode for suppressing unevenness in density, instead of the operation mode being selected according to a result of the document type discrimination. As described above, the unevenness in density that the present invention intends to suppress results from mechanical vibration of the apparatus. Accordingly, when, for example, an installed condition of the apparatus is ideal and a vibration seldom occurs, it can be set that the operation mode for suppressing unevenness in density that a user can manually set is not used.

It may be set that the operation mode for suppressing unevenness in density that a user can manually select is used, wherein a document type discrimination is carried out and the operation mode for suppressing unevenness in density is executed with respect to a document type in which unevenness in density is likely to occur.

The present invention may be configured by hardware logic, or by software with a CPU as will be described below.

In other words, an image processing apparatus comprises: a CPU (Central Processing Unit) that executes an instruction of a control program realizing respective functions; a ROM (Read Only Memory) that stores the program; a RAM (Random Access Memory) that develops the program; a memory device (a recording medium) such as a memory that stores the program and a variety of data, and the like. And an object of the present invention can also be attained by providing a computer-readable storage medium in which program codes of a program capable of a composite process of filter coefficients (an execution mode program, an intermediate code program, and a source program) are stored, the program being software for realizing the above-mentioned functions, and by enabling the computer (or a CPU or an MPU) to read out and realize the program codes stored in the storage medium.

As the storage medium, (i) a tape, such as a magnetic or cassette tape; (ii) a disk, including a magnetic disk, such as a floppy disk (registered trademark) or hard disk, or an optical disk, such as a CD-ROM, MO, MD, DVD, or CD-R; (iii) a card, such as an IC (including a memory card) or optical card; or (iv) a semiconductor memory such as a mask ROM, EPROM, EEPROM, or flash ROM can be used.

Also, the image processing apparatus can be configured to be connectable to a communication network to provide the program codes via the communication network. The communication network is not particularly limited, and includes, for example, Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. The transmission medium constituting the communication network includes, for example, a wired line such as a line using IEEE1394 standard, a USB line, a power line, a cable TV line, a telephone line, an ADSL line and the like, as well as a wireless line such as a line utilizing an infrared ray used in IrDA and a remote controller, a line using Bluetooth (registered trademark) or IEEE802.11 standard, a line utilizing HDR, a mobile phone network, a satellite line, a terrestrial digital network and the like. Note that, the present invention can be implemented in a form of a computer data signal which is realized by electronic transmission of the program code and which is embedded in a carrier wave.

As described above, an image processing apparatus according to the present invention is an image processing apparatus for carrying out an image processing on image data composed of a plurality of color components, the image processing apparatus including: a document type discrimination section for discriminating a type of a document which is read to obtain the image data; an image processing section for carrying out enhancement and error diffusion processes on the image data; a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by the under color removal process, and the image processing apparatus being arranged in a manner such that if the document type discrimination section discriminates the document as a printed photo document or a text/printed photo document that includes black halftones, then the image processing section carrying out the enhancement and the error diffusion processes on the image data, and the black generation amount calculation section and the under color removal process section executing a non-uniform image suppressing operation mode in which no black generation and under color removal process is carried out on a pixel in which a minimum value of the image data composed of the plurality of color components is at least equal to or less than a predetermined threshold.

According to the configuration, because the enhancement and the error diffusion processes are carried out on a printed photo document or a text/printed photo document that includes black halftones, a blur of the output image can be suppressed and, for example, small texts, etc. on a map can clearly be indicated. During the enhancement and the error diffusion processes, if unevenness in density (line noise) occurs due to color misregistration in RGB components of the read image, the unevenness in density as well would possibly be enhanced, however, such unevenness in density is suppressed by executing the non-uniform image suppressing operation mode in which no black generation and under color removal process is carried out.

Another image processing apparatus according to the present invention is an image processing apparatus for carrying out an image processing on image data composed of a plurality of color components, the image processing apparatus including: a segmentation process section for segmenting the image data into a plurality of regions including at least a black halftone region; an image processing section for carrying out enhancement and error diffusion processes on the image data; a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by under color removal process, and the image processing apparatus being arranged in a manner such that with respect to a region segmented into the black halftone region by the segmentation process section, the image processing section carrying out the enhancement and error diffusion processes on the image data, and the black generation amount calculation section and the under color removal process section executing a non-uniform image suppressing operation mode in which no black generation and under color removal process is carried out on pixel whose color density is at least equal to or less than a predetermined color density.

According to the configuration, because the enhancement and the error diffusion processes are carried out with respect to a region segmented into a black halftone region, a blur of the output image can be suppressed and, for example, small texts, etc. on a map can clearly be indicated. During the enhancement and the error diffusion processes, if unevenness in density (line noise) occurs due to color misregistration in RGB components of the read image, the unevenness in density as well would possibly be enhanced, however, such unevenness in density is suppressed by executing the non-uniform image suppressing operation mode in which no black generation and under color removal process is carried out.

The image processing apparatus may be configured in a manner such that the predetermined threshold is higher in the case in which the non-uniform image suppressing operation mode is executed than in a case in which the non-uniform image suppressing operation mode is not executed.

The image processing apparatus may be configured in a manner such that, in the non-uniform image suppressing operation mode, the black generation amount calculation section sets that all of the black generation amounts are 0 and the under color removal process section sets that all of the under color removal amounts are 0.

According to the configuration, since a black component is not outputted, unevenness in density can effectively be suppressed even in a region of black halftones or line screens of an original document, where unevenness in density is likely to occur due to color misregistration in RGB components of an image input apparatus.

The image processing apparatus may be configured in a manner such that, in the non-uniform image suppressing operation mode, the black generation amount calculation section and the under color removal process section do not carry out the black generation and under color removal process when the minimum value of the image data composed of the plurality of color components is equal to or less than a first threshold, whereas when the minimum value exceeds the first threshold, the above sections carry out the black generation and under color removal process only on a portion where the minimum value exceeds the first threshold.

According to the configuration, although the black component remains to slightly be outputted, unevenness in density can be suppressed in a region of black halftones or line screens of an original document, where unevenness in density is likely to occur due to color misregistration in RGB components of an image input apparatus. In addition, because an amount of printing-out is not too large, frequency of malfunctions of an image output apparatus can be reduced and output failures of an output medium such as a paper can be prevented.

The image processing apparatus may be configured in a manner such that, in the non-uniform image suppressing operation mode, the black generation amount calculation section sets that all of the black generation amounts are 0, and the under color removal process section does not carry out an under color removal process when the minimum value of the image data composed of the plurality of color components is equal to or less than a second threshold, whereas when the minimum value exceeds the second threshold, the under color removal process section carries out the under color removal process only on a portion where the minimum value exceeds the second threshold.

According to the configuration, although a reproduction color density may slightly be decreased in an achromatic color or a high color density portion closed to the achromatic color, unevenness in density can be suppressed in a region of black halftones or line screens of an original document, where unevenness in density is likely to occur due to color misregistration in RGB components of an image input apparatus. In addition, because an amount of printing-out is not too large, frequency of malfunctions of an image output apparatus can be reduced and output failures of an output medium such as a paper can be prevented.

Yet another image processing apparatus according to the present invention is an image processing apparatus for carrying out an image processing on image data composed of a plurality of color components, including a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by the under color removal process, the black generation amount calculation section and the under color removal process section having a non-uniform image suppressing operation mode (i) in which no black generation and under color removal process is carried out on a pixel in which a minimum value of the image data composed of the plurality of color components is at least equal to or less than a predetermined threshold, and (ii) which can be manually selected or unselected.

According to the configuration, if unevenness in density (line noise) occurs due to color misregistration in RGB components of a read image, the unevenness in density (line noise) can be suppressed by selecting the non-uniform image suppressing operation mode in which no under color removal process is carried out.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to image forming apparatuses using a color toner or color ink.

REFERENCE SIGNS LIST

| 10 | Color image input apparatus |
|---|---|
| 30 | Color image processing apparatus (Image processing apparatus) |
| 31 | A/D conversion section |
| 32 | Shading correction section |
| 33 | Input tone correction section |
| 34 | Document type discrimination section |
| 35 | Segmentation process section |
| 36 | Color correction section |
| 37 | Black generation and under color removal section |
| 371 | Maximum and minimum values calculation section |
| 372 | UCR amount calculation section |
| 373 | Black generation amount calculation section |
| 374 | UCR process section |
| 38 | Spatial filter process section (Image processing section) |
| 39 | Output tone correction section |
| 40 | Tone reproduction process section (Image processing section) |

The invention claimed is:

1. An image processing apparatus for carrying out an image processing on image data composed of a plurality of color components, comprising:
   a document type discrimination section for discriminating a type of a document which is read to obtain the image data;
   an image processing section for carrying out enhancement and error diffusion processes on the image data;
   a black generation amount calculation section for calculating a black generation amount for each pixel based on the image data; and
   an under color removal process section for performing an under color removal process in which the under color removal process section calculates an under color removal amount for each pixel based on the image data so as to determine image data of a plurality of color components, which image data is to be obtained by the under color removal process,
   if the document type discrimination section discriminates the document as a printed photo document or a text/printed photo document that includes black halftones, then the image processing section carrying out the enhancement and the error diffusion processes on the image data, and the black generation amount calculation section and the under color removal process section executing a non-uniform image suppressing operation mode in which no black generation and under color removal process is carried out on a pixel in which a minimum value of the image data composed of the plurality of color components is at least equal to or less than a predetermined threshold.

2. The image processing apparatus as set forth in claim 1, wherein the predetermined threshold is higher in the case in which the non-uniform image suppressing operation mode is executed than in a case in which the non-uniform image suppressing operation mode is not executed.

3. The image processing apparatus as set forth in claim 1, wherein:

in the non-uniform image suppressing operation mode, the black generation amount calculation section sets that all of the black generation amounts are 0 and the under color removal process section sets that all of the under color removal amounts are 0.

4. The image processing apparatus as set forth in claim 1, wherein:

in the non-uniform image suppressing operation mode, the black generation amount calculation section and the under color removal process section do not carry out the black generation and under color removal process when the minimum value of the image data composed of the plurality of color components is equal to or less than a first threshold, whereas when the minimum value exceeds the first threshold, the above sections carry out the black generation and under color removal process only on a portion where the minimum value exceeds the first threshold.

5. The image processing apparatus as set forth in claim 1, wherein:

in the non-uniform image suppressing operation mode, the black generation amount calculation section sets that all of the black generation amounts are 0, and the under color removal process section does not carry out the under color removal process when the minimum value of the image data composed of the plurality of color components is equal to or less than a second threshold, whereas when the minimum value exceeds the second threshold, the under color removal process section carries out the under color removal process only on a portion where the minimum value exceeds the second threshold.

6. An image forming apparatus comprising an image processing apparatus as set forth in claim 1.

7. A non-transitory computer-readable storage medium in which an image processing program for operating an image processing apparatus as set forth in claim 1 is stored, the image processing program operating a computer as the respective sections.

8. An image processing apparatus for carrying out an image processing on image data composed of a plurality of color components, comprising:

a segmentation process section for segmenting the image data into a plurality of regions including at least a black halftone region;

an image processing section for carrying out enhancement and error diffusion processes on the image data;

a black generation amount calculation section for calculating a black generation amount for each pixel based on the image data; and an under color removal process section for performing an under color removal process in which the under color removal process section calculates an under color removal amount for each pixel based on the image data so as to determine image data of a plurality of color components, which image data is to be obtained by under color removal process, with respect to a region segmented into the black halftone region by the segmentation process section, the image processing section carrying out the enhancement and error diffusion processes on the image data, and the black generation amount calculation section and the under color removal process section executing a non-uniform image suppressing operation mode in which no black generation and under color removal process is carried out on pixel whose color density is at least equal to or less than a predetermined color density.

9. The image processing apparatus as set forth in claim 8, wherein the predetermined color density is higher than a threshold of a case in which the non-uniform image suppressing operation mode is not executed.

10. The image processing apparatus as set forth in claim 8, wherein:

in the non-uniform image suppressing operation mode, the black generation amount calculation section sets that all of the black generation amounts are 0 and the under color removal process section sets that all of the under color removal amounts are 0.

11. The image processing apparatus as set forth in claim 8, wherein:

in the non-uniform image suppressing operation mode, the black generation amount calculation section and the under color removal process section do not carry out the black generation and under color removal process when the minimum value of the image data composed of the plurality of color components is equal to or less than a first threshold, whereas when the minimum value exceeds the first threshold, the above sections carry out the black generation and under color removal process only on a portion where the minimum value exceeds the first threshold.

12. The image processing apparatus as set forth in claim 8, wherein:

in the non-uniform image suppressing operation mode, the black generation amount calculation section sets that all of the black generation amounts are 0, and the under color removal process section does not carry out the under color removal process when the minimum value of the image data composed of the plurality of color components is equal to or less than a second threshold, whereas when the minimum value exceeds the second threshold, the under color removal process section carries out the under color removal process only on a portion where the minimum value exceeds the second threshold.

13. An image forming apparatus comprising an image processing apparatus as set forth in claim 8.

14. A non-transitory computer-readable storage medium in which an image processing program for operating an image processing apparatus as set forth in claim 8 is stored, the image processing program operating a computer as the respective sections.

* * * * *